Patented Aug. 7, 1951

2,563,328

UNITED STATES PATENT OFFICE 2,563,328

COTTONSEED OIL REFINING PROCESS

Robert Grover Folzenlogen, Columbia Township, Hamilton County, Ohio, assignor to The Procter and Gamble Company, Ivorydale, Ohio, a corporation of Ohio No Drawing. Application September 19, 1949, Serial No. 116,607

14 Claims. (Cl. 260—425)

The present invention relates to the refining of cottonseed oil, and more particularly to the removal of free fatty acid and other undesirable impurities from crude cottonseed oil by treatment with aqueous solutions of sodium hydroxide.

The alkali refining of crude cottonseed oil is an old art, basically involving mixing an aqueous solution of sodium hydroxide with the oil to neutralize free fatty acid, precipitate mucilaginous material, and remove coloring matter and other undesirable impurities along with the soap formed in the neutralization procedure. The precipitate thus formed is commonly referred to in the art as "foots." In addition to impurities and excess sodium hydroxide solution, the foots contain a considerable proportion of neutral oil which is emulsified in the foots and carried down therewith. This neutral oil has only foots value and represents an appreciable loss in the yield of neutral oil and a corresponding increase in refining expense.

It is an object of my invention to reduce the loss of neutral oil in the alkali refining of crude cottonseed oil.

Numerous procedures have been proposed in the past for effecting reduction in the loss of neutral oil, the most promising procedure thus far developed being the continuous method wherein the separation of foots from the refined oil is effected centrifugally rather than by gravity. However, even in such centrifugal procedures there is an appreciable amount of neutral oil held up by the foots due to emulsification and although the process of my invention is of particular value in the reduction of the refining loss in batch procedures employing gravity separation of the foots, the invention may be used to advantage in the further reduction of losses obtained in centrifugal procedures.

I have found that the properties of those substances which effect emulsification of neutral oil in the foots may be markedly changed by the incorporation of certain non-ionic ethers in the crude oil prior to the addition of the refining lye whereby the amount of neutral oil so emulsified in the foots is materially reduced. In accordance with my invention, the crude oil is first treated with at least one non-ionic ether compound, liquid at about 80° F., and of the group consisting of (1) non-cyclic ethers of those polyhydric alcohols which contain from 2 to 3 alcoholic hydroxyl groups and whose carbon skeletons have from 2 to 8 carbon atoms, and (2) non-ionic derivatives of such of said ethers as contain at least one unreacted hydroxyl group wherein the hydrogen atom of at least one hydroxyl group has been substituted. Following this treatment, the crude oil is refined in the usual way with sodium hydroxide solution. I have found, however, that the action of the non-ionic ether appears to be enhanced if a small amount of water is incorporated with the mixture of crude oil and non-ionic ether before the addition of the lye.

It is to be understood that although the ethers used in the practice of my invention are identified as ethers of polyhydric alcohols, such ethers may be formed from compounds other than polyhydric alcohols, such as polyhydric alcohol anhydrides for example.

Various types of non-ionic ether compounds can be employed in the practice of the invention, as will be apparent from the list of compounds given below. It will be noted, moreover, that with respect to derivatives of those ether compounds which contain unreacted hydroxyl groups, such derivatives may be formed, for example, by the reaction of the hydroxyl group with carboxylic acids, compounds containing an unreacted alcoholic hydroxyl group, phenols, amines, and mercaptans. Thus, for example, tetraethylene glycol or the monoethyl ether of ethylene glycol per se can be used, or those non-ionic derivatives which are liquid at about 80° F. and which may be formed by reaction of other compounds with the unreacted hydroxyl group of the glycol can be employed. With respect to such derivatives it is important to observe that the success of the invention does not depend on the radical substituted for the hydrogen atom of the hydroxyl group provided that the derivative is liquid at about 80° F. that it is non-ionic, and that it contains ether groups intact. Having such chemical and physical properties, the derivative (or the original ether) can be used in the practice of my invention and a reduction in the refining loss will be observed.

As will be noted from the following detailed description, the essential distinguishing feature of the refining procedure of my invention over those hitherto employed is in the treatment of the crude oil with the non-ionic ether compound, preferably in combination with the step of incorporating water in the mixture of crude oil and non-ionic ether, prior to the addition of the refining lye.

As in hitherto employed refining procedures, the concentration and amount of refining lye, and the temperature of refining will vary depending on the proportion and kind of minor constituents contained in the oil. Higher concentrations of lye are preferably used when the concentration of free fatty acid and color constituents in the crude oil is high. However, necessary adjustments to compensate for such variations in the oil constitution are known to those versed in the art and have no influence on the advatages of using the non-ionic ethers in accordance with my invention. It is to be observed, however, that in the preferred method involving the incorporation of water with the mixture of crude oil and non-ionic ether prior to addition of the lye, the amount of water added should be compensated for by an increase in the concentration of the sodium hydroxide solution used in the neutralization step.

The following examples will illustrate the manner in which my invention may be practiced, but it is understood that the procedures therein described are merely illustrative and are not intended to be limiting. Percentages are by weight.

Example 1.—Crude cottonseed oil having a free fatty acid content of 0.5% was agitated for 5 minutes at 75–80° F. with 0.1% (based on the oil) of methoxy polyethylene glycol having a molecular weight of about 750. At the end of this period 1% of water was added to the mixture and agitation was continued for 15 minutes. The thus treated crude oil with the non-ionic ether and water present was refined in the customary way with 5.4% of 9.5% sodium hydroxide solution. Specifically the lye was mixed with the mixture of oil, non-ionic ether, and water for about 15 minutes at 75–80° F. The foots formed were coagulated by heating the mixture to about 140° F. under reduced agitation, and after settling, the refined oil was decanted. The average loss of 3 refinings conducted as above indicated was 2.5%, and the average of 5 refinings made with the use of 6.4% of 8% sodium hydroxide solution without the use of either non-ionic ether or water was 3.2%. It is apparent from the above data that the instant process was effective in reducing the refining loss about 22%, even when conducted on a crude oil having a very low loss under the customary batch refining procedure of the prior art.

It is to be noted that here, as well as in succeeding examples wherein procedures are directly compared, the amount of actual sodium hydroxide used in refining is substantially the same in each of the procedures of the comparison.

The same crude oil was refined in accordance with the present invention as illustrated in Example 1, with use of polypropylene glycol of about 1200 molecular weight, with mono-n-propyl triethylene glycol, and with octyl phenol polyglycol (about 10 ethylene groups) ether (commercially available as Triton N-100), substantially the same reduction in loss being effected.

Example 2.—Separate samples of a crude cottonseed oil having a free fatty acid content of 1.8% respectively were mixed at 75–80° F. with 0.1% (based on weight of oil) of the refining aids listed in the table given below. In each case after 5 minutes agitation, 1% water was added and the agitation was continued for 15 minutes. Thereafter 7.7% of 9% sodium hydroxide solution was added to the mixture of crude oil, water, and non-ionic ether to effect refining of the crude oil as indicated in Example 1. Losses obtained in practicing the process of the present invention are indicated in the table and may be compared with the loss obtained by refining the crude oil in the normal way with 8.7% of 8% sodium hydroxide solution without the addition of either non-ionic ether or water.

| Refining Aid | Per Cent Loss |
| --- | --- |
| Polypropylene glycol of 1200 molecular weight | 5.8 |
| Polypropylene glycol of 400 molecular weight | 5.6 |
| Dimethoxy tetraglycol | 5.8 |
| Polyisobutylene glycol | 6.1 |
| Ethylene glycol monoethyl ether | 6.0 |
| Diethylene glycol monoethyl ether | 6.4 |
| Mixture of 1 part polypropylene glycol 1200 molecular weight, 1 part polyisobutylene glycol and 1 part nonaethylene glycol | 5.7 |
| Mixture of 1 part propylene glycol, 1 part polypropylene glycol of molecular weight 400 and 1 part of polypropylene glycol of 1200 molecular weight | 5.4 |
| Mixture of 1 part nonaethylene glycol and 1 part polypropylene glycol of 400 molecular weight | 5.8 |
| None (8.7% of 8% sodium hydroxide) | [1] 7.2 |

[1] Blank.

Example 3.—Crude cottonseed oil containing 2.2% free fatty acid was refined batchwise in the normal way with 9.7% of 8% sodium hydroxide solution. The loss obtained was 8.6%.

The same crude cottonseed oil was thoroughly mixed at 75–80° F. with 0.1% (based on the weight of the oil) of octyl phenol polyglycol (about 10 ethylene groups) monoether (sometimes referred to as Triton N-100) for 2 minutes. 9.7% of 8% sodium hydroxide solution was then added without previous addition of water and the refining was completed in the normal way. The loss obtained was 7.6%.

Example 4.—Crude cottonseed oil containing 1.0% free fatty acid was agitated at ordinary room temperature with 0.3% of polypropylene glycol of molecular weight 400 for 5 minutes. To the mixture was added 1% of water, and agitation was continued for 15 minutes. To the mixture of crude oil, non-ionic ether and water was added 6.3% of 9.3% sodium hydroxide solution, and the refining was completed in the normal way. A loss of 3.2% was obtained.

The same crude oil refined with 7.3% of 8% sodium hydroxide solution without the addition of non-ionic ether or water gave a loss of 5.1%.

In place of the non-ionic ethers used in the case of the above specific examples, the following non-ionic ethers and derivatives or mixtures thereof can be used with advantageous reduction in loss.

Monothioether of dodecyl mercaptan and polyethylene glycol containing about 10 ethylene groups
Monoether of tall oil and polyethylene glycol containing about 10 ethylene groups
Monoether of polyethylene glycol and sorbitan monooleate (a commercial product sometimes referred to as Tween 81)
Monoester of octaethylene glycol and the fatty acids of cottonseed oil hydrogenated to about 70 I. V.
Monoether of dodecyl phenol and hexadecaethylene glycol
Dipropylene glycol
Reaction product of one mol monoethanolamine and six mols of ethylene oxide
Reaction product of one mol of a mixture of amines derived from coconut oil and six mols of ethylene oxide
Hexaethylene glycol
Nonaethylene glycol
Dodecaethylene glycol
Lauric acid monoester of diethylene glycol
Acetic acid diester of diethylene glycol
Lauric acid diester of tetraethylene glycol Lauric acid diester of nonaethylene glycol
Stearic acid monoester of octaethylene glycol
Monoester of octaethylene glycol and coconut oil fatty acids
Diethyl ether of ethylene glycol
Monobutyl ether of ethylene glycol
Dibutyl ether of ethylene glycol
Monobenzyl ether of ethylene glycol
Diethyl ether of diethylene glycol
Monobutyl ether of diethylene glycol
Dimethyl ether of diethylene glycol
Dibutyl ether of tetraethylene glycol
Dilauryl ether of tetraethylene glycol
Monoether of dodecyl phenol and heptaethylene glycol
Monomethyl ether of octaethylene glycol
Monoethyl ether of octaethylene glycol
Monoether of octaethylene glycol and cholesterol
Monoether of dodecyl phenol and decaethylene glycol
Monomethyl ether of dodecaethylene glycol
Monoether of dodecaethylene glycol and cholesterol
Monomethyl ether of hexadecaethylene glycol
Reaction product of one mol ethylene diamine and six mols of ethylene oxide
Monoester of the fatty acids of cottonseed oil hydrogenated to about 70 I. V. and the polyglycol obtained by the condensation of one mol of monoethyl ether of diethylene glycol with two mols of ethylene oxide
Monoester of the fatty acids of cottonseed oil hydrogenated to about 70 I. V. and the polyglycol obtained by the condensation of one mol of monoethyl ether of diethylene glycol with six mols of ethylene oxide
Monoester of the fatty acids of cottonseed oil hydrogenated to about 70 I. V. and the polyglycol obtained by the condensation of one mol of monoethyl ether of diethylene glycol with eight mols of ethylene oxide
Monoester of the fatty acids of cottonseed oil hydrogenated to about 70 I. V. and the monoethyl ether of tetraethylene glycol
Monoester of the fatty acids of cottonseed oil hydrogenated to about 70 I. V. and the monoethyl ether of octaethylene glycol
Monoester of the fatty acids of cottonseed oil hydrogenated to about 70 I. V. and the monoethyl ether of decaethylene glycol
Polypropylene glycol of about 300 mol. wt. (Wyandotte Chem. Corp. Sample 0-2990, Pluracol P-284), about pentapropylene glycol
Ether-glycol derived by the reaction of one mol coconut oil fatty alcohols with 1.8 mols isobutylene oxide
Ether-glycol derived by the reaction of one mol coconut oil fatty alcohols with 2.4 mols isobutylene oxide
Alpha monobutyl ether of glycerol
Monoester of the fatty acids of cottonseed oil hydrogenated to about 70 I. V. and diglycerol
Polyglycol of about 300 mol. wt. prepared from a mixture of 2.6 mols ethylene oxide and 1 mol propylene oxide prepared by Wyandotte Chem. Corp. and sometimes referred to as Pluracol 2.6-M-298
Polyglycol obtained by reacting 1 mol ethylene glycol with 3 mols isobutylene oxide
Monomethyl ether of a polyglycol prepared by the reaction of two mols ethylene oxide with one mol propylene oxide (Wyandotte Chem. Corp. Sample 0-2897, Alkyl Pluracol)
Monopropyl ether of a polyglycol prepared by the reaction of two mols ethylene oxide with one mol propylene oxide (Wyandotte Chem. Corp. Sample 0-2894, Alkyl Pluracol)
Ether reaction product resulting from the condensation of 2-methyl pentanediol-2,4 with about 7 mols of ethylene oxide
Ether reaction product resulting from the condensation of octylene glycol with about 7 mols of ethylene oxide As will be noted from the above examples, marked improvement in refining loss is obtained when the amount of non-ionic ether employed is as low as 0.1 per cent. However, even smaller amounts, such as 0.05 per cent (based on the weight of the oil) of some of the more active ethers, effect noticeable improvement in loss. Obviously all ethers covered in the present application are not equally effective in their efficiency to reduce refining loss and mixtures may be employed if desired. Amounts of some compounds which are necessary to achieve outstanding reduction in refining loss may equal 0.5 per cent, and even greater proportions may be desirable in some instances. However, more than 2 per cent of non-ionic ether is uneconomical because the decrease in loss is not always proportional to the increase in amount of ether employed. Moreover, I have noted that the effect of the use of mixtures of ethers and/or derivatives is substantially cumulative.

From the above it is clear that the number of compounds which can be successfully used in the practice of my invention is very great. Of outstanding preference, however, are those polyglycols containing at least two glycol units, each unit containing from 2 to 4 carbon atoms and derivatives of such polyglycols in which the hydrogen atoms of one or both hydroxyl groups are substituted by etherification with alkyl groups containing from 1 to 18 carbon atoms.

In practicing the invention, intimate contact of the non-ionic ether with the crude oil should be effected and the time of mixing will therefore vary depending on the size of the batch of the oil being refined, the violence of agitation, etc. After intimate contact has been established, further agitation for at least one minute, preferably for not less than 5 minutes, is desirable.

The amount of water preferably added to the mixture of crude oil and non-ionic ether prior to the lye addition may be varied appreciably without markedly affecting the refining loss. Thus from about 0.1 per cent to about 5 per cent can be employed, but 0.5 per cent to 2 per cent seems to be optimum. Amounts of water in excess of 5 per cent effect little if any added improvement. In fact such large amounts must be used with care because of the danger of adversely affecting the refining loss.

The mixing time may vary from 5 to 30 minutes but at least 15 minutes' agitation is preferred to insure intimate contact in cases of comparatively mild agitation such as are normally used in batch refining.

In Example 1, I have set forth a specific method for carrying out the actual refining procedure after treatment of the crude oil with the refining aid in accordance with my invention. It is to be understood, however, that I am not limited to the particular method of effecting neutralization of the free fatty acid and separation of the refined oil from the foots. These procedures may be varied appreciably, depending on the type of oil being refined, and variations in the procedure with which those versed in the art are familiar may be readily substituted without departing from the spirit of the invention.

Moreover, although the specific description of the invention has been related to batch refining primarily because the greatest reduction in refining loss is noted in such batch procedures, it is to be understood that my invention can be used to advantage in continuous refining procedures employing continuous mixing of the constituents added to the oil, followed by continuous centrifugal separation of the refined oil and precipitated foots.

Having thus described my invention, what I claim and desire to secure by Letters Patent is:

1. In the process of refining crude cottonseed oil involving the steps of neutralizing free fatty acid with an aqueous solution of sodium hydroxide wherein impurities are precipitated as foots and of separating refined oil from the foots, the said crude oil containing mucilaginous and emulsifying materials tending to effect emulsification of substantial neutral oil in the foots, the step of agitating the said crude oil prior to the addition of sodium hydroxide solution with at least one non-ionic compound, liquid at about 80° F. and of the group consisting of (1) non-cyclic ethers of those polyhydric alcohols which contain from 2 to 3 hydroxy groups and whose carbon skeletons have from 2 to 8 carbon atoms, and (2) non-ionic organic derivatives of such of said ethers as contain at least one unreacted hydroxyl group wherein the hydrogen atom of at least one hydroxyl group has been substituted.

2. The process of claim 1 in which the designated non-ionic compound is a polyglycol containing at least two glycol units, each unit containing from 2 to 4 carbon atoms.

3. The process of claim 2 in which the designated non-ionic compound is a polyglycol having a molecular weight of about 400.

4. The process of claim 2 in which the designated non-ionic compound is polypropylene glycol having a molecular weight of about 400.

5. The process of claim 2 in which the hydrogen atom of one hydroxyl group of the polyglycol is substituted.

6. The process of claim 2 in which the hydrogen atom of one hydroxyl group of the polyglycol is etherified.

7. The process of claim 2 in which the hydrogen atom of one hydroxyl group of the polyglycol is substituted with an alkyl group having from 1 to 18 carbon atoms.

8. The process of claim 2 in which the hydrogen atoms of both hydroxyl groups of the polyglycol are substituted.

9. The process of claim 2 in which the hydrogen atoms of both hydroxyl groups of the polyglycol are etherified.

10. The process of claim 2 in which the hydrogen atoms of both hydroxyl groups of the polyglycol are each substituted with an alkyl group having from 1 to 18 carbon atoms.

11. The process of alkali refining crude cottonseed oil wherein neutral oil and foots are formed, said crude oil containing mucilaginous and emulsifying materials tending to effect emulsification of substantial neutral oil in the foots, which comprises agitating the said crude oil with at least one non-ionic compound liquid at about 80° F. and of the group consisting of (1) non-cyclic ethers of those polyhydric alcohols which contain from 2 to 3 hydroxy groups and whose carbon skeletons have from 2 to 8 carbon atoms, and (2) non-ionic organic derivatives of such of said ethers as contain at least one unreacted hydroxyl group wherein the hydrogen atom of at least one hydroxyl group has been substituted, adding water to the mixture of crude oil and non-ionic compounds, then adding an aqueous solution of sodium hydroxide to neutralize the free fatty acid in the oil and precipitate minor impurities contained therein and separating said precipitated impurities from the refined oil.

12. The process of claim 11 in which the amount of non-ionic compound is from about 0.05 per cent to about 2 per cent, based on the weight of the crude oil.

13. The process of claim 11 in which the amount of non-ionic compound is from about 0.05 per cent to about 2 per cent based on the weight of the oil and in which the amount of water is from about 0.1 per cent to about 5 per cent of the mixture of oil and non-ionic compound.

14. The process of claim 11 in which the non-ionic compound is mixed with the crude oil for at least one minute before adding the water, and in which the water is mixed with the crude oil and non-ionic compound for at least 15 minutes before adding the aqueous solution of sodium hydroxide.

ROBERT GROVER FOLZENLOGEN.

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 2,225,575 | Thurman | Dec. 17, 1940 |